C. TOMLINSON, J. H. K. & T. E. SORRICK.
Woolen Packings.

No. 151,064.                              Patented May 19, 1874.

Witnesses:
Geo. W. Rice
Horace Rogers

Inventors:
Curtis Tomlinson
John H. K. Sorrick
Thomas E. Sorrick
per Humphry & Stuart
Attys.

UNITED STATES PATENT OFFICE.

CURTIS TOMLINSON, JOHN H. K. SORRICK, AND THOMAS E. SORRICK, OF AKRON, OHIO.

IMPROVEMENT IN WOOLEN PACKINGS.

Specification forming part of Letters Patent No. 151,064, dated May 19, 1874; application filed April 13, 1874.

*To all whom it may concern:*

Be it known that we, CURTIS TOMLINSON, JOHN H. K. SORRICK, and THOMAS E. SORRICK, of Akron, Summit county, Ohio, have invented an Improved Woolen Packing, of which the following is a specification:

Our invention relates to that class of packing used around the piston and valve rods of steam-engines, plungers and piston-rods of pumps, and all other places where an air, steam, or water tight joint is desired around a shaft or rod. Our object is to provide greater elasticity and durability, and lessen friction and consequent wear on the sliding parts. To this end we have adopted woolen fabric as the base of the packing, because of its greater elasticity, which prevents it packing into a solid dead mass, as does hemp or cotton, and have protected and supported it by vulcanized rubber. Our invention consists in a hollow cylinder, composed of alternate layers of woolen fabric and rubber, held together with a cement of rubber and benzine, having a covering and lining of rubber, which are in turn covered and lined, respectively, with a firm woolen cloth.

We construct the cylinder by winding upon a mandrel a layer of firm woolen cloth, followed by a layer of rubber. Upon this is built up the cylinder of alternate layers, consisting of two or three thicknesses of coarse woolen fabric, followed by a layer of rubber; and when of the proper size a layer of rubber is wound on and covered with the woolen cloth first used. All the successive layers, either of cloth or rubber, are cemented together, and the rubber may be vulcanized before or after the cylinder is formed.

In steam-engines it will be found advantageous to use the packing without vulcanizing, as the heat of the engine will effect that process, and the expansion of the rubber due to the process will cause the packing to fill the space more perfectly.

The packing may be made of the proper length at first, or in a long roll, and cut off in suitable lengths.

The possibility of leakage through the woolen filling may be obviated by covering the ends with rubber and cloth in the same manner as the cylinder is lined and covered.

Figure 1:
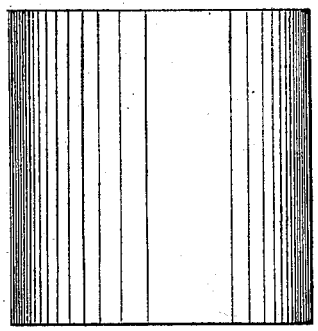
Figure 2:
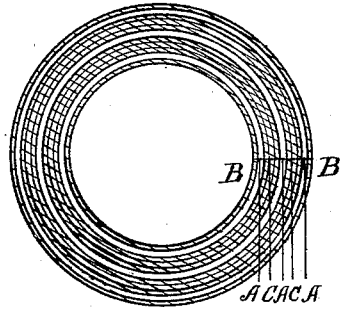

In the drawing, Figure 1 is a side elevation, and Fig. 2 a cross-section, in which the rubber, firm cloth, and coarse fabric are lettered, respectively, A, B, and C.

We claim—

The herein-described packing, consisting of an outside and inside cylindrical shell of vulcanized rubber, covered and lined, respectively, with firm woolen cloth, the intermediate space being filled by alternate layers, consisting of two or three thicknesses of coarse woolen cloth and single thickness of rubber, the whole cemented together with rubber cement.

CURTIS TOMLINSON.
JOHN H. K. SORRICK.
THOMAS E. SORRICK.

Witnesses:
JOHN H. CAMPBELL,
JOHN F. HOY.